United States Patent

Yamamoto et al.

[15] 3,648,117
[45] Mar. 7, 1972

[54] MAGNETIC DEVICE

[72] Inventors: Mititake Yamamoto, Kyoto; Genzo Uekusa, Takatsuki; Shigeru Tanimura, Kyoto; Norio Maejima, Kameoka, all of Japan

[73] Assignee: Omron Tatusi Electronics Co., Kyoto, Japan

[22] Filed: Mar. 5, 1970

[21] Appl. No.: 16,752

[52] U.S. Cl. ............................ 317/156, 317/146, 335/205, 336/110, 340/197
[51] Int. Cl. .................................................. H01h 47/22
[58] Field of Search ................. 335/205, 103, 104, 266; 336/110; 330/8, 63; 323/51, 52, 56, 88, 89; 317/155, 155.5, 156, 146, 148; 235/145, 178; 340/197; 307/314

[56] References Cited

UNITED STATES PATENTS

| | | | |
|---|---|---|---|
| 2,218,711 | 10/1940 | Hubbard | 336/110 X |
| 2,906,942 | 9/1959 | Mittag | 317/148 |
| 3,014,185 | 12/1961 | Montner | 330/8 |
| 3,020,503 | 2/1962 | Reijnst | 336/110 |
| 3,146,393 | 8/1964 | Gibbon | 323/56 |
| 3,346,802 | 10/1967 | Biet | 321/45 DT |
| 3,439,117 | 4/1969 | Mathamel et al. | 340/365 X |
| 3,456,132 | 7/1969 | Dechelotte | 323/51 X |
| 3,495,236 | 2/1970 | Mathamel | 335/205 X |

*Primary Examiner*—J. D. Miller
*Assistant Examiner*—Harry E. Moose, Jr.
*Attorney*—Craig, Antonelli, & Hill

[57] ABSTRACT

Transmission of electric signals from a primary coil to a secondary coil can be effectively controlled by moving a magnet to and from a magnetic core of ferromagnetic substance, such as iron, or a ferrimagnetic substance, such as ferrite. Similar control is obtainable by changing the DC control current in a third coil wound on the magnetic core. By utilizing the above-mentioned controls, various electric devices, for instance, a keyboard switch without contacts suitable for an electronic calculator, a variable inductor, a vibration-free AC relay, etc. can be made.

16 Claims, 19 Drawing Figures

Patented March 7, 1972

INVENTORS
MITETAKE YAMAMOTO, GENZO UEKUSA,
SHIGERU TANIMURA and NORIO MAEJIMA
BY
Craig, Antonelli, Stewart & Hill
ATTORNEYS Patented March 7, 1972

MAGNETIC DEVICE

BACKGROUND OF THE INVENTION

This invention relates to a magnetic device which can be electromagnetically controlled so as to impart various effects to an electric circuit connected to it.

The inventors have discovered the following phenomena: (1) that in a magnetic device comprising a magnetic core of ferromagnetic substance or ferrimagnetic substance having at least a coil wound on the core, the B-H curve, namely, the magnetization curve, shrinks keeping a nearly similar shape and a center position with its hysteresis loop when a permanent magnet nears the core, and (2) that in the device, the B-H curve moves almost in the direction of the horizontal axis keeping a nearly similar shape and size as its hysteresis loop when DC current flows in a coil wound around the core.

This invention has been made by applying the foregoing phenomena.

SUMMARY OF THE INVENTION

A magnetic device of the present invention comprises a magnetic circuit in which at least one part is constituted by a ferromagnetic or a ferrimagnetic substance, at least one coil is electromagnetically linked to said magnetic circuit, and a control means is provided for effecting the magnetic state in said magnetic circuit.

One object of the present invention is to provide a new and useful magnetic device for use in an electric circuit.

Another object of the present invention is to provide a new and useful switching device for use in an electric circuit.

BRIEF DESCRIPTION OF THE DRAWING

These and other objects of this invention will become apparent from the following description of a desirable embodiment with reference to the accompanying drawing, in which.

DETAILED DESCRIPTION OF THE INVENTION

Figure 1:
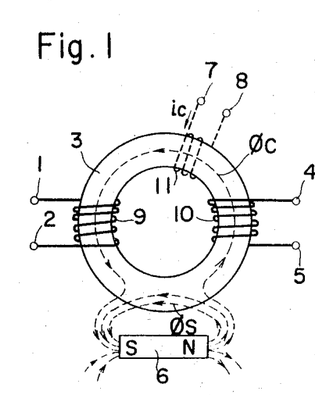
FIG. 1 is a plan view of a basic embodiment of the present invention.
Figure 2:
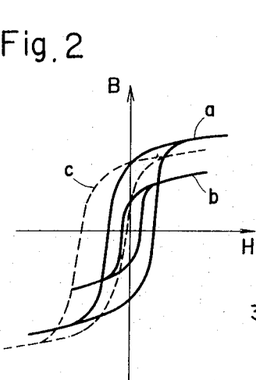
FIG. 2 is a graph of the magnetization curve of a magnetic core in accordance with the present invention.

In FIG. 1 a primary coil 9 and a secondary coil 10 are wound around a magnetic core 3 made of ferromagnetic substance, such as iron, or a ferrimagnetic substance, such as ferrite, i.e., of a magnetic material having a soft or streamlined hysteresis characteristic, as seen in FIG. 2. A permanent magnet 6 is movably positioned near the magnetic core 3. A magnetic device thus constituted works as a transformer, that is, when the permanent magnet 6 is positioned sufficiently far from the core 3, and AC signal applied to input terminals 1 and 2 is transmitted to output terminals 4 and 5. However, when the permanent magnet 6 nears the magnet core 3, so that a considerable part of the magnetic flux of the magnet 6 strays in the magnetic core 3 and forms magnetic fluxes $\phi_c$ and $\phi_s$, the magnetization curve of the core 3 designated by a solid line $a$ in FIG. 2 shrinks into a smaller curve designated by a solid line $b$ in FIG. 2, keeping a nearly similar shape and the center position of its hysteresis loop. As a consequence of the above phenomenon, the output signal obtained at the terminals 4 and 5 decreases in correspondence with the degree of proximity of the permanent magnet 6 to the magnetic core 3. Thus, control of the output intensity in response to the mechanical adjustment of the position of magnet 6 is obtainable in the above-mentioned magnetic device.

In another magnetic device which comprises a third core 11 wound around the core 3, but no permanent magnet near the core 3, when a DC control current $i_c$ which flows in the coil 11 increases, said magnetization curve of the core 3 designated as $a$ in FIG. 2 moves almost in the direction of the horizontal axis as designated by a dashed line $c$ in FIG. 2, keeping a nearly similar shape and the size of its hysteresis loop. As a consequence of this loop-shifting phenomenon, the waveform of the output signal obtained at the terminals 4 and 5 changes from that of the input signal applied to the terminals 1 and 2. That is to say, in the alternating current output signal, the phases of the positive-side component and the negative-side component shift from each other, and accordingly, the effective phase of the output signal shifts with respect to the phase of the input signal. When the DC current increases further, the hysteresis loop shrinks, consequently lowering the output signal. The above-mentioned phenomena can be observed not only in a magnetic device having a magnetic circuit completely closed by magnetic substance, but also in a magnetic device forming a complex magnetic circuit in which at least one part is of nonmagnetic substance.

The above-mentioned phenomenon providing the shift of effective phase can be utilized as a phase-dividing means or a phase-shifting means applicable in electromagnetic devices, such as an electromagnet.

Figure 3:
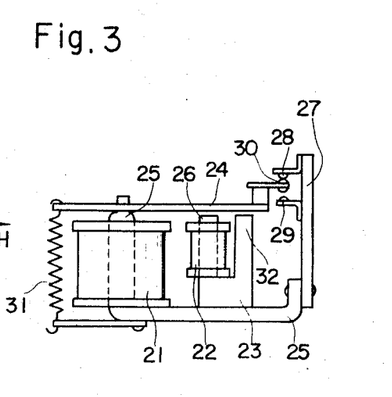
FIG. 3 is a side view of a relay embodying the present invention.
Figure 4:
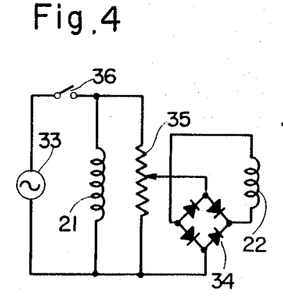
FIG. 4 is a circuit diagram of the relay shown in FIG. 3.

FIG. 3 and FIG. 4 illustrate an AC relay device in which the above-mentioned phase-shifting phenomenon is utilized. In FIG. 3, a main coil 21 is wound around a magnetic core 25, and an auxiliary coil 22 is wound around one narrow part 26 of a pair of narrow parts 26 and 32 of the polepiece 23. Numeral 24 indicates an armature, 27 a terminal board, 28 and 29 fixed contacts, 30 a moving contact, and 31 a resetting spring. As is shown in FIG. 4, the main coil 21 is connected across output terminals of an AC power source 33 through a switch 36, and the auxiliary coil 22 is connected to a rectifier circuit 34 which is fed by the AC power source 33 through an adjusting potentiometer 35, so that a rectified DC current is fed from the rectifier circuit 34 to the auxiliary coil 22. By means of said DC current in the auxiliary coil 22, a nonalternating magnetic flux is induced in the narrow part 26 of the polepiece 23, and effects an interference with the alternating magnetic flux induced by the AC current in the main coil 21. As a consequence of said magnetic interference, the effective phase of the magnetic flux of the narrow part 26 shifts from that of the narrow part 32, according to the above-mentioned loop-shifting phenomenon. The degree of the phase shift can be adjusted by controlling the DC current in the coil 22 by adjusting the potentiometer 35. Thus, by adjusting the effective phase difference between the magnetic fluxes of the narrow parts 26 and 32 to around 90°, the armature 24 is attracted to the polepiece 23 without vibration. This device is superior to conventional relays having a shading ring on its polepiece, because the effective phase difference of the magnetic fluxes of the two narrowed parts on the polepiece can be adjusted to attain the best result.

Figures 5, 6:
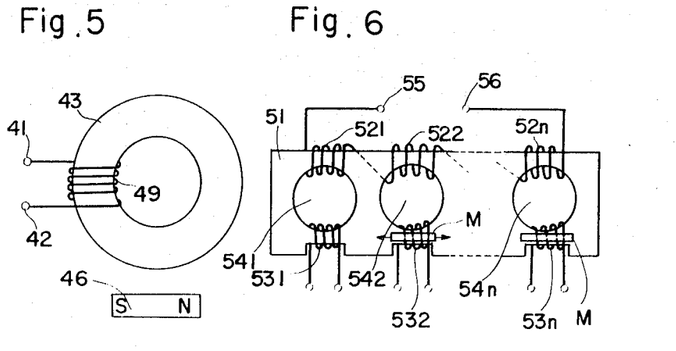
FIG. 5 is a plan view of a variable inductor embodying the present invention.
FIG. 6 is a plan view of a switching device embodying the present invention.

FIG. 5 illustrates a variable inductor according to the present invention. In FIG. 5, a magnetic core 43 of ferromagnetic or ferrimagnetic substance has only one coil 49, and a permanent magnet 46 is provided so as to approach or recede from the core 43. When the permanent magnet 46 approaches the core 43, the magnetization curve of the core 43 shrinks into a smaller curve keeping a nearly similar shape and the center position of its hysteresis loop, as has been explained in the example of FIG. 1. As a consequence of said shrinking of the magnetization curve, the apparent inductance seen from terminals 41 and 42 of the coil decreases. Thus, the apparent inductance can be controlled by moving the permanent magnet 46.

FIG. 6 illustrates a combination switch made by embodying the present invention. A magnetic core 51 has holes 541, 542, ..., 54n and primary coils 521, 522, ..., 52n, which are wound around narrowed parts between respective holes 541, 542, ..., 53n are wound around opposite narrowed parts between said holes 541, 542, ..., 54n and the other side of the core 51. When a movable permanent magnet M is positioned close to one of the narrowed parts around which is wound one of the output coils, the proximate output coil does not generate an output signal, while the other output coils continue generating output signals. The device can be so constituted that only one movable magnet M moves in the direction indicated by arrows in the Figure and the output signal is extinguished at one selected coil, or it may be constituted so that each permanent magnet is provided above each secondary coil and the output signals can be extinguished at plural selected coils simultaneously. This magnetic device can be utilized for multiple-combined switches, or for a motion-detecting device to detect the motion of the magnet by change in output signals.

Figure 7:
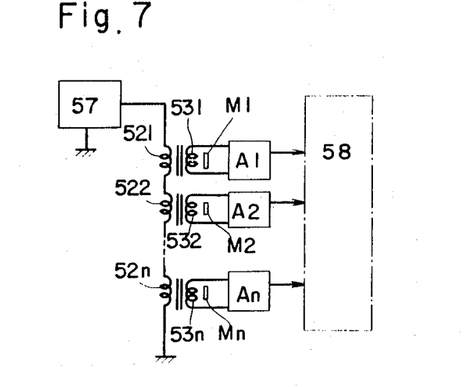
FIG. 7 is a circuit diagram of an electronic device provided with the switching device shown in FIG. 6.
Figure 8:
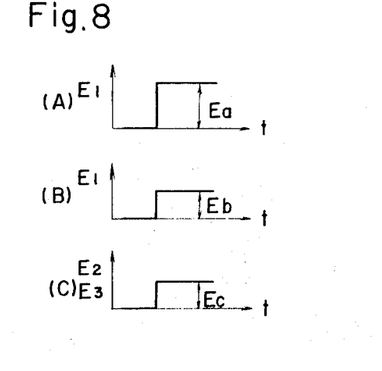
FIG. 8 is a graph illustrating an output voltage of one of the switching devices shown in FIG. 7.

One example of the electric switching device capable of inhibiting the simultaneous input of more than two signals by utilizing the magnetic device shown in FIG. 6 is illustrated by FIG. 7, and its operation is illustrated by FIG. 8. In FIG. 7, primary coils 521, 522, ..., 52n are connected together in series, and are fed by one constant voltage AC power source 57. Each of the movable permanent magnets M1, M2, ..., Mn is provided so as to face each narrowed part of the core 51 around which is wound each of secondary coils 531, 532, ..., 53n. Each of the secondary coils 531, 532, ..., 53n is connected to input terminals of each of the discriminators A1, A2, ..., An, the output terminals of these discriminators being connected to an electric circuit 58 to be controlled by this device. Each of the discriminators A1 to An is so constituted that the output signal is applied to the electric circuit 58 only when each input signal voltage exceeds a preset voltage E1. By so constituting the arrangement, when one magnet, for instance M2, is drawn apart from its proximate narrowed part and other magnets are positioned close to their respective proximate narrowed parts, an output signal having a voltage $E_a$ is applied from the secondary coil 532 to the discriminator A2, as shown in FIG. 8(A). When two magnets, for instance M1 and M2, are erroneously drawn apart from their proximate narrowed parts and other magnets are positioned close to their respective narrowed parts, output signals are applied from the coil 531 to the discriminator A1 and from the coil 532 to the discriminator A2, respectively. In this erroneous operation, however, as shown in FIG. 8(B), the respective output signal has the voltage $E_b$, which is half of that of the previous correct operation where only one magnet was drawn apart, because the two primary coils 521 and 522 share the constant AC output voltage, by half and half. Since the output voltage in the erroneous operation is approximately half of that in the correct operation, by setting said preset voltage between the output voltages of erroneous operation and correct operation, the signal made by the erroneous operation can be stopped at the discriminators A1 to An, thereby not being transferred to the electric circuit 58.

In another embodiment, each discriminator can be constituted so as to discriminate and pass a signal, the voltage of which is between a preset upper limit E2 and a preset lower limit E3, as shown in FIG. 8(C). By setting the preset limits E2 and E3 properly, a switching device can be made in which the output signal $E_c$ is obtained from the discriminator only when a preset number of magnets are operated.

Figure 9:
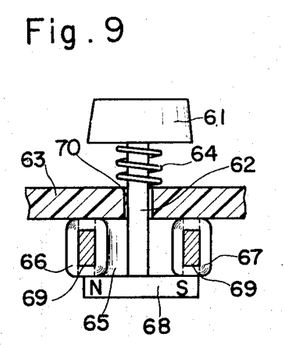
FIG. 9 is a partly sectional side view of a switching device embodying the present invention.
Figure 10:
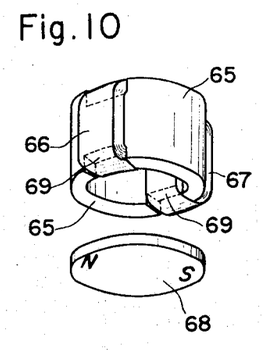
FIG. 10 is an exploded perspective view of parts of the switching device shown in FIG. 9.

FIG. 9 and FIG. 10 illustrate an example of a mechanical arrangement of a magnetic device of the present invention. In the drawing, a ring-shaped magnetic core 65 of ferromagnetic or ferrimagnetic material is fixed under the face of a fixing board 63, and a primary coil 66 and a secondary coil 67 is wound around the core 65 at indents 69 so that the lower faces of coils 66 and 67 do not project lower than the lower face of the core 65. A movable permanent magnet 68 is supported by a rod 62 penetrating through a hole 70 in the board 63. A pressure spring 64 is provided around the rod 62 and between the upper face of the board 63 and a pressing knob 61 fixed to the upper end of the rod 62, so that the magnet 68 is pressed against the lower face of the core 65.

Figure 11:
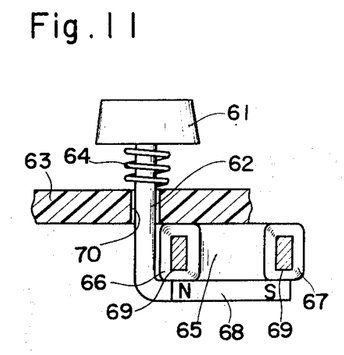
FIG. 11 is a partly sectional side view of another switching device embodying the present invention.

FIG. 11 illustrates another example of a mechanical arrangement of a magnetic device. In the drawing, the magnetic core 65, coils 66 and 67 are the same as that of the device of FIG. 9. However, the movable permanent magnet 68 is made from a magnet alloy such as carbon steel, and a rod 62' for driving the magnet 68 is made continuous to the magnet 68. The spring 64 is provided between the knob 61 and the board 63 as in the example of FIG. 9. This example has an advantage that assembly of magnet 68 with the rod 62' is easy, and that the mass of the moving assembly is small enabling lighter and quicker operation.

Magnetic devices illustrated by FIGS. 9 and 10 and FIG. 11 have features that the output signal is induced in the secondary coil when the knob is pressed down, and that the small stroke of the movement of the magnet is sufficient to obtain an output signal of considerable voltage, because the great change of the effect to the magnetic state of the core is obtainable when the gap between the core and the magnet is small.

The indents provided in the magnetic core ensure the tight contacting of the magnet to the core, by embracing coils in them.

Figure 12:
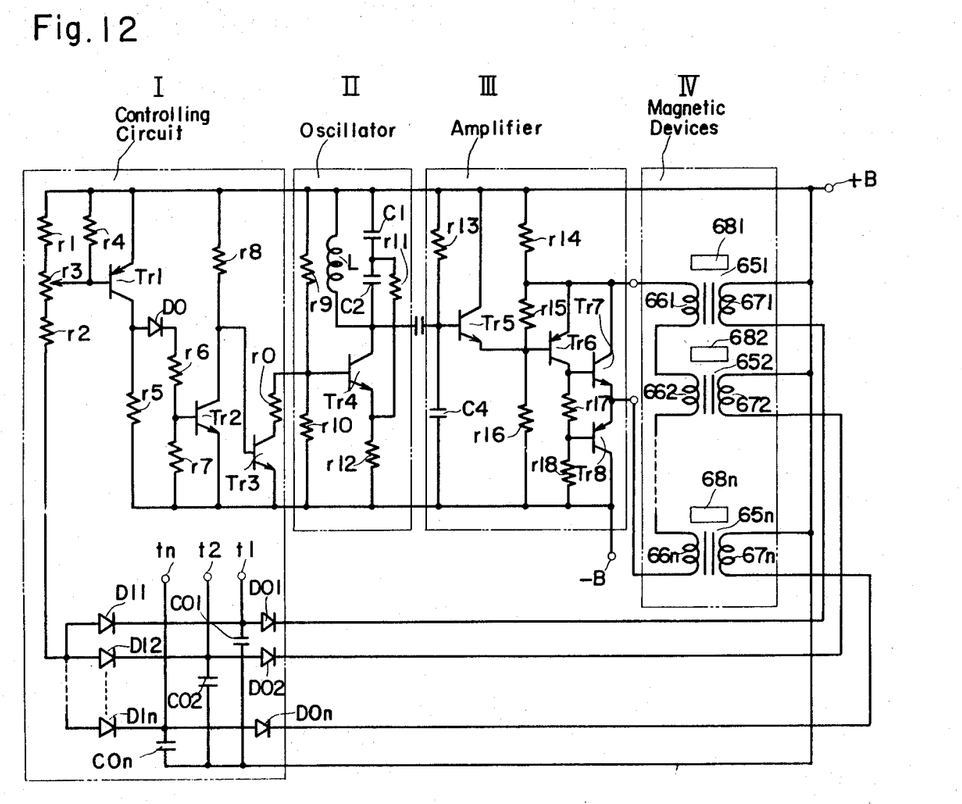
FIG. 12 is a circuit diagram of an electronic switching device provided with the switching device shown in FIGS. 9 and 10 or FIG. 11.

In order to obtain a sharply rising output signal by utilizing the above-mentioned device, the electronic circuit can be constituted as shown in FIG. 12. In this figure, symbols r0 to r18 designate resistors, Tr1 to Tr8 designate transistors, D0 D01 to D0n and D11 to D1n designate diodes, C1 to C4 and C01 to C0n designate capacitors, 661 to 66n designate primary coils of the magnetic device, 671 to 67n designate secondary coils, 681 to 68n designate movable magnets, 651 to 65n designate magnetic cores, t1 to tn designate output terminals of the magnetic devices, and +B and −B designate positive and negative terminals connected to a DC power source to provide DC current, respectively. The circuit consists of four blocks enclosed by phantom lines and designated by I, II, III, and IV. The first block designated I works as a controlling circuit for controlling oscillation of an oscillator II in response to the output of the magnetic devices in the block IV. An amplifier III amplifies the output signal from the oscillator II and feeds the amplified signal to the magnetic devices in block IV. The oscillator II and the amplifier III constitute an AC power source.

When all of the movable magnets of the magnetic devices IV contact each magnetic core, no output signal is induced in the respective secondary coils, and accordingly, no control voltage appears in the base electrode of the transistor Tr1, and the transistor Tr1 and Tr2 are in the "off" state while the transistor Tr3 is in the "on" state. In consequence of the "on"

state of the transistor Tr3, the base bias voltage of the transistor Tr4 is kept low, accordingly causing the oscillation output voltage of the oscillator II to be low. Such a low AC output voltage is amplified by the amplifier III, and a low amplified AC voltage is applied to the series-connected primary coils 661 to 66n of the magnetic devices IV.

Figure 13:
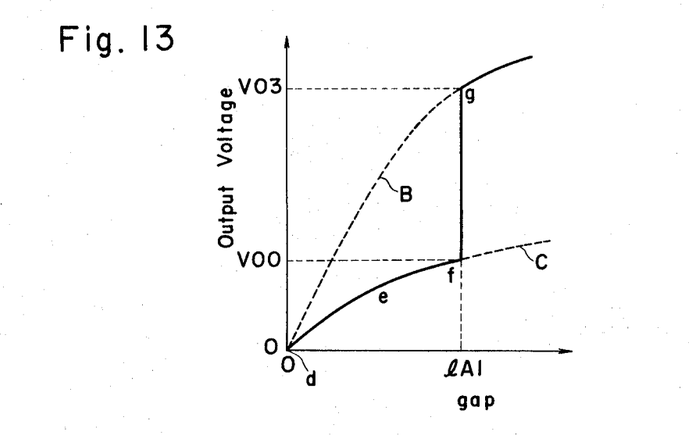
FIG. 13 is a graph illustrating the operation of the electronic switching device shown in FIG. 12.

When, one of the magnets, for instance 682, is pushed down so as to move away from the magnetic core 652, an AC voltage induced in the secondary coil 672 increases in response to the increase of the gap between the lower face of the magnetic core 652 and the upper face of the permanent magnet 682, as shown by curve d-e-f in the graph of FIG. 13, wherein the abscissa indicates the gap and the ordinate indicates the output voltage of the secondary coil. In the FIG. 13, curve C indicates the stroke-output voltage characteristic when the oscillator output is not increased, while curve B indicates the characteristic when the oscillator output has been increased. As the output voltage of the coil 672 increases, the base voltage of the transistor Tr1 falls, causing conduction of the transistors Tr1 and Tr2, and cutoff of the transistor Tr3. In consequence of the cutoff of the transistor Tr3, the bias voltage of the oscillating transistor Tr4 becomes high, causing sharp increase in the output of the oscillator II. On account of said increase in the output voltage of the oscillator II, the input voltage of the primary coil 662 is increased, and hence, the output voltage of the secondary coil 672, which can be obtained from the output terminal t2, increases proportionally.

By designating the relevant electronics circuits with due care, the rising characteristic of said increase of the output voltage at the terminal t2 can be made sufficiently sharp as well as large in voltage increase, as shown by a straight line f-g in the graph of FIG. 13. That is, by utilizing the above-mentioned circuit, the output signal at the terminals t1 to tn instantaneously rises jumping from the point f in FIG. 13 to the point g in a moment. This instantaneous rise-up of output signal is useful in feeding trigger signals in parallel for simultaneous triggering to more than two electronic circuits each having threshold input values differing from each other. Moreover, by utilizing the above electronic circuits, the moving strokes of the permanent magnets necessary for obtaining a desired output voltage can be made far smaller than the operation without the above electronic circuits.

Figure 14:
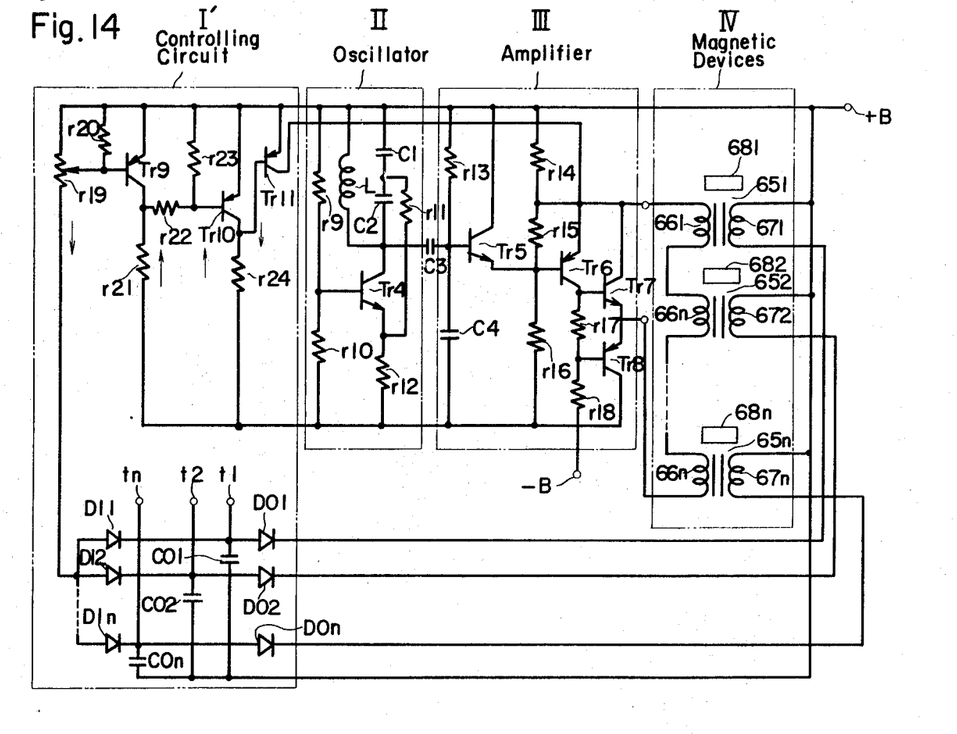
FIG. 14 is a circuit diagram illustrating a variation of the embodiment shown in FIG. 12.

FIG. 14 is a circuit diagram of another example of an electronic circuit having functions similar to those shown in FIG. 12. In the figure, parts corresponding to those of the example of FIG. 12 are indicated with the same reference numerals. Changes are made in the upper part of controlling circuit I', in which, symbols r19 to r24 designate resistors, and Tr9 to Tr11 designate transistors. In this example, the transistor Tr11 works to control gain of a circuit of transistors Tr6, Tr7 and Tr8 in response to the change of the voltage at the base electrode of the transistor Tr9, so that the gain increases when said base voltage goes down. Thus, the same function, to increase the output voltage of the amplifier III when an output signal is induced in the secondary coil, is obtainable with this example.

Figure 15:
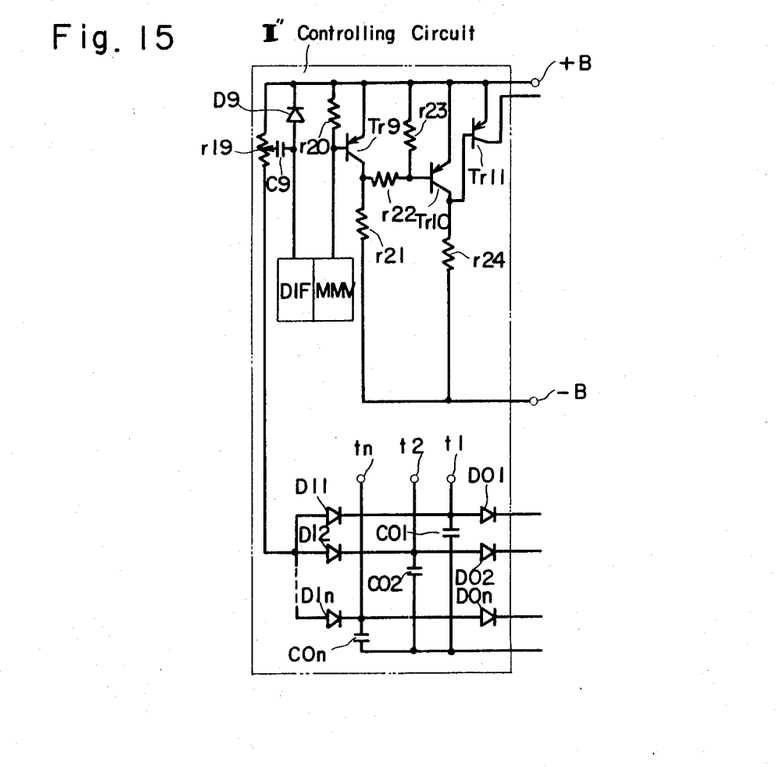
FIG. 15 is a circuit diagram illustrating a variation of the controlling circuit shown in FIG. 14.

FIG. 15 illustrates a circuit to be substituted for the controlling circuit I' in the example shown in FIG. 14, to form another example of the electronic circuit. In the circuit, the lower part is the same as that of FIG. 14, and a change is made in the upper part, wherein, a positive differential circuit DIF and a monostable multivibrator MMV of very short pulsewidth, for instance 10 millisecond, is provided. The input terminal of the differential circuit DIF is connected to a dividing point of the resistor r19 through a capacitor C9, and to the positive power terminal +B through a diode D9. The output terminal of the differential circuit DIF is connected to an input terminal of the multivibrator MMV, and an output terminal of the multivibrator MMV is connected to the base electrode of the transistor Tr9.

When one of the permanent magnets is pushed down so as to separate from the proximity of the magnetic core and causes the lower output signal to be applied from the secondary coil to the controlling circuit, the differential circuit DIF gives an output signal and triggers the multivibrator MMV, at the rise-up moment of said lower signal. Accordingly, the transistor Tr11 is made conductive for a short period set by the pulsewidth of the multivibrator MMV, from the triggered moment, and therefore, heightens the output voltage at one of the terminals t1 to tn only for said short period. If an erroneous pushing down of the magnet was made by, for instance, mistouching of the knob, whenever a period longer than said pulsewidth period exists between the first correct pushing and the second erroneous pushing, the second erroneous pushing of the magnet does not make any effective output signal available from the output terminals t1 to tn.

Accordingly, by utilizing this control circuit, even when two or more knobs of the magnetic devices are erroneously pushed down without any apparent separation period inbetween, only the first pushing makes an effective output signal available from the output terminal, and false generation of output signals is avoided safely.

Figure 16:
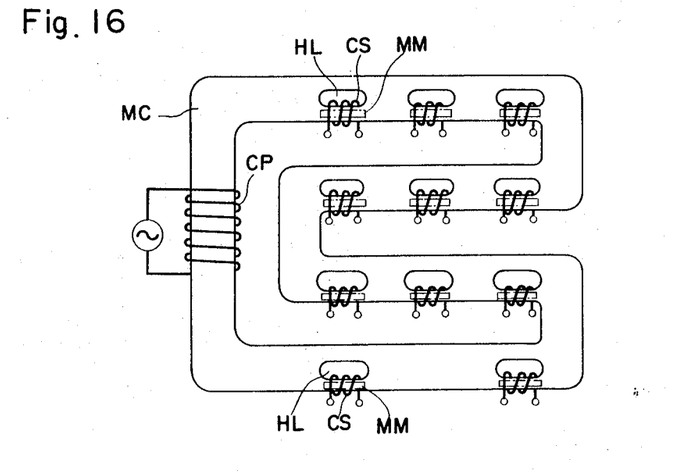
FIG. 16 is a plan view of a combined magnetic device for use as a keyboard switching device of an electronic calculator.

FIG. 16 illustrates a magnetic device embodying the present invention for use in an electronic calculator for general use. In the figure a magnetic core MC of ferromagnetic or ferrimagnetic material is shaped in a zigzag-formed closed magnetic circuit having 10 or more holes HL opened linearly along the core. A common primary coil CP is wound around a part of the core, and each secondary coil CS is wound on each narrowed part formed between one side of the core MC and each hole HL. Over each narrowed part wound by the secondary oil is provided each movable permanent magnet MM, so as to be moved to change the degree of magnetic coupling with each narrowed part, by handling, for instance, pressing a button (not shown) connected to the magnet MM by a rod (not shown). The electronic circuit illustrated by FIGS. 12, 13, 14, and 15 can be utilized for this device.

This example has advantages in that the structure of the magnetic core is very simple, compact and economical, and in that there is no need of winding the respective primary coil against each secondary coil. Thus, this example is suitable for mass production of the combined switching magnetic device for such devices as electronic calculators.

Figure 17:
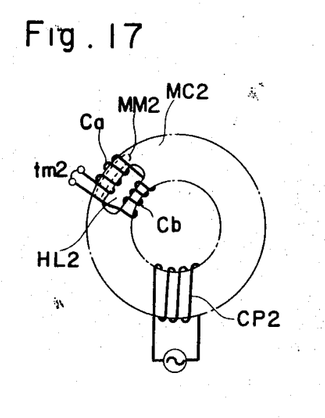
FIG. 17 is a plan view of a magnetic device capable of generating output signals, when a movable permanent magnet nears its magnetic core.

FIG. 17 illustrates an embodiment of the present invention wherein an output AC signal is obtained when a movable permanent magnet nears its magnetic core. In the figure, a primary coil CP2 is wound around a part of a ring-shaped magnetic core MC2 of ferromagnetic or ferrimagnetic substance. A secondary coil consists of two coils Ca and Cb, each being wound around each narrowed part on each side of a hole HL2 opened in the core MC2, and connected differentially in series together. In this device, when a movable permanent magnet MM2 nears one of the narrowed parts around which is wound the secondary coil Ca or Cb, a signal is induced only in the secondary coil Cb or Ca, making the output signal available to the output terminals. When the magnet MM2 recedes from either of the narrowed parts, the output signal at the terminals tm2 vanishes, on account of the offsetting of the output signals of both coils Ca and Cb.

Figure 18:
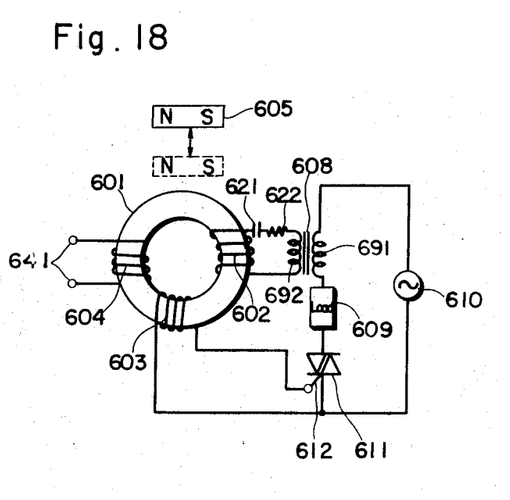
FIG. 18 and FIG. 19 are each a circuit diagram of an electric device embodying the present invention.

FIG. 18 is a circuit diagram of an embodiment of the present invention. In this figure, a primary coil 602, a secondary coil 603 and a third trigger input coil 604 are wound around the magnetic core 601 of ferromagnetic or ferrimagnetic material. A movable permanent magnet 605 for cutoff operation is provided near the core 601. To the primary coil 602 is connected a secondary coil 692 of a transformer 608 through a capacitor 621 and a resistor 622. An AC power source 610, a primary coil 691 of the transformer 608, a load 609 and a bilateral semiconductor switching device with control electrode (hereinafter referred to as BSSC) 611 are connected in series, and a control electrode 612 of the BSSC 611 is connected to the secondary coil 603 so as to be triggered by an output signal of the secondary coil 603.

When a triggering input signal is imparted from the terminals 641 to the third coil 604, the triggering signal is induced in the secondary coil 603, then is imparted to the control electrode 612 of the BSSC 611, and triggers the BSSC 611. Once the BSSC 611 is triggered, a signal is induced in the secondary coil 692 of the transformer 608 by a load current flowing in the primary coil 691 of the transformer 608. This induced signal is imparted to the primary coil 602 receiving a desirable phase shift by impedance elements 621 and 622, and causes a triggering signal to be induced in the coil 603.

When the permanent magnet 605 is put close to the core 601 as indicated by dashed line, the triggering signal is not induced in the secondary coil 603, and the BSSC 611 is cut off. This cut off condition remains after the receding of the magnet 605 from the core 601.

Figure 19:
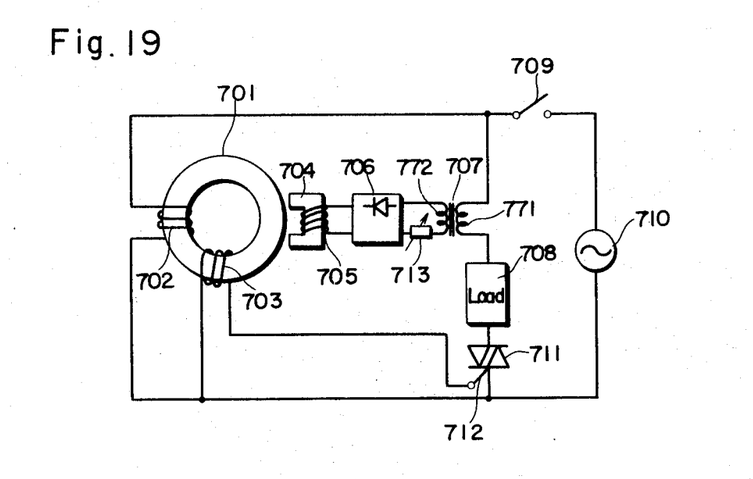

FIG. 19 is a circuit diagram of another embodiment of the present invention. In this figure, a primary coil 702 and a secondary coil 703 are wound around a magnetic core 701 of ferromagnetic or ferrimagnetic material. An electromagnet 704 is provided so as to magnetically couple with the core 701. A primary coil 771 of a transformer 707, load 708, and a BSSC 711 are connected in series through a switch 709 across output terminals of an AC power source 710. A control electrode 712 of the BSSC 711 is connected to the secondary coil 703. Input terminals of a rectifying circuit 706 having a preset time constant is connected to a secondary coil 772 of the transformer 707 through a variable resistor 713, and output terminals of the rectifying circuit 706 are connected to a coil 705 of the electromagnet 704.

After closing of the switch 709, a triggering signal is induced in the secondary coil 703 by an alternating magnetic flux induced by a current which flows in the primary coil 702, and the BSSC 711 is made conductive thereafter. When an overload current arises in the load circuit, the input current of the rectifier circuit 706 increases, and accordingly, the magnetic flux of the electromagnet 704 increases. Consequently, the induced current in the secondary coil 703 diminishes, and the BSSC 711 is cut off. After removal of the cause of overload, conduction of the BSSC 711 is restored after a desired period set by time constant of the rectifier circuit 706. A limit value of the overload current at which the BSSC 711 is cut off can be adjusted by adjusting the variable resistor 713.

Although the present invention has been described with reference to but a single embodiment, it is to be understood that the scope of the invention is not limited to the specific details thereof, but is susceptible of numerous changes and modifications as would be apparent to one with normal skill in the pertinent technology.

What is claimed is:

1. A magnetic device comprising:
   a magnetic circuit in which at least one part is constituted by a magnetic substance by the time
   a primary coil and a secondary coil, both electromagnetically linked to said magnetic circuit,
   a control coil electromagnetically linked to said magnetic circuit, and
   a DC current source which feeds a controlling DC current to said control coil so that the effective phase of the output signal induced in said secondary coil shifts in response to said DC current.

2. A magnetic device comprising:
   at least two magnetic circuits, each of which has at least one part made of a magnetic substance,
   at least two independent, unconnected secondary coils electromagnetically linked to said respective magnetic circuits providing separate and independent signal outputs, respectively,
   at least two primary coils electromagnetically linked to said magnetic circuit, respectively, and electrically connected in series together, and
   at least one movable permanent magnet for affecting the magnetic states in said magnetic circuits.

3. A magnetic device of claim 2, further comprising:
   an AC power source which feeds said series-connected primary coils with an AC output signal of constant voltage, and
   at least two discriminators, to which said secondary coils are connected respectively, so as to discriminate the voltage of the output signals of the secondary coils.

4. A magnetic device of claim 2, further comprising:
   an AC power source which feeds said series-connected primary coils with an AC output signal of a constant voltage, and
   at least two discriminators to which said secondary coils are connected, respectively, and which are capable of discriminating respective AC output signals of said secondary coils, within respective preset voltage ranges defined by respective upper and lower voltage limits.

5. A magnetic device comprising:
   a magnetic circuit in which at least one part is constituted by a magnetic substance
   a primary coil electromagnetically linked to said magnetic circuit,
   a secondary coil electromagnetically linked to said magnetic circuit,
   a movable permanent magnet for affecting the magnetic state in said magnetic circuit,
   an AC power source for feeding an AC output signal to said primary coil, and
   a controlling circuit to sharply change the amplitude of said AC output signal fed by the AC power source to said primary coil in response to a change of the signal induced in said secondary coil.

6. A magnetic device of claim 5, wherein said AC power source comprises at least an oscillating circuit and an amplifying circuit.

7. A magnetic device of claim 5, further comprising:
   an AC power source for feeding an AC output signal to said series-connected primary coils,
   a controlling circuit to sharply change the amplitude of said AC power source in response to a change of signal induced in either one of said secondary coils.

8. A magnetic device of claim 6, wherein the controlling circuit for controlling the amplitude of the AC output signal to said primary coil includes means for controlling the intensity of oscillation of said oscillating circuit.

9. A magnetic device of claim 6, wherein the controlling circuit for controlling the amplitude of the AC output signal to said primary coil includes means for controlling the gain of said amplifying circuit.

10. A magnetic device of claim 7, wherein said controlling circuit comprises means for limiting the period of intensification of said AC output signal to said primary coil to a preset period from a rise of the induced signal in said secondary coil.

11. A magnetic device comprising:
    a magnetic core made of a magnetic material,
    a primary coil wound around said magnetic core,
    a secondary coil wound around said magnetic core,
    a movable permanent magnet and means for normally holding said permanent magnet against said magnetic core and
    driving means including a manually operated key connected directly to said magnet for selectively displacing said movable permanent magnet from said position of normal contact with said magnetic core.

12. A magnetic device of claim 11, wherein said movable permanent magnet is made of a magnet alloy, and has a supporting means made continuous to it.

13. A magnetic device of claim 11, wherein said magnetic core is shaped in a ring having indents for coils so that said movable permanent magnet may tightly contact said magnetic core.

14. A magnetic device comprising:
    at least two magnetic circuits made of a magnetic material,
    at least two secondary coils linked to said magnetic circuits, respectively,
    at least two primary coils linked to said magnetic circuits, respectively, and electrically connected together in series, at least two movable permanent magnets and means for normally holding said permanent magnets against said magnetic circuits, respectively, and at least two driving means for selectively displacing said movable permanent magnets from said position of normal contact with said magnetic circuits, respectively.

15. A magnetic device comprising:

one magnetic core made of a magnetic material having two divided magnetic circuits, a pair of secondary coils wound to link to said two magnetic circuits, respectively, and differentially connected together in series, one primary coil wound around said magnetic core to induce magnetic flux in both magnetic circuits, respectively, and a movable permanent magnet for affecting the magnetic states of one of said magnetic circuits.

16. A retaining relay comprising:

a magnetic core of a material having a trigger coil, a primary coil and secondary coil, a movable permanent magnet for affecting the magnetic state of the core, a bilateral semiconductor switching device with a control electrode, connected to said secondary coil, and means for imparting an AC current to the primary coil when a load current controlled by said switching device exists.

* * * * *